H. H. HACKSTEDDE.
FLOUR STORING, ELEVATING, AND SIFTING APPARATUS.
APPLICATION FILED AUG. 23, 1917.
1,320,684. Patented Nov. 4, 1919.
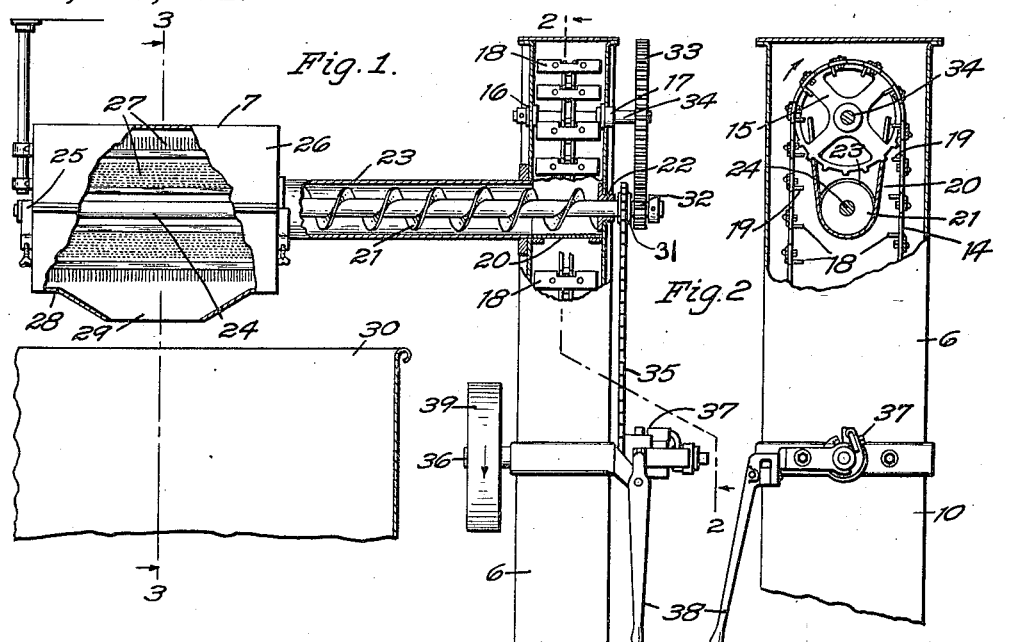
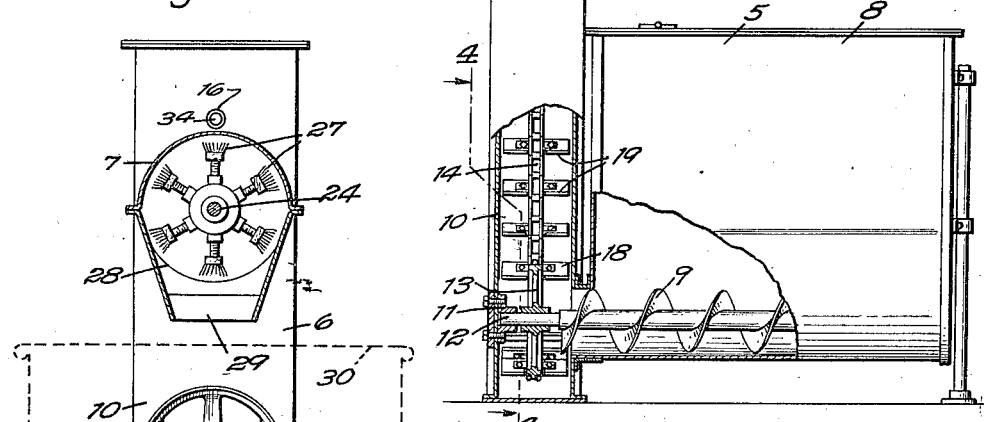
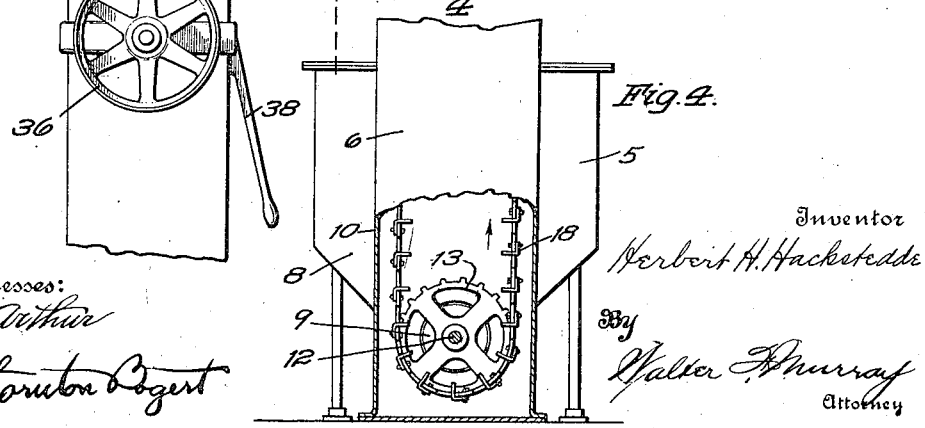
Inventor
Herbert H. Hackstedde
By
Walter F. Murray
Attorney
Witnesses:

UNITED STATES PATENT OFFICE.

HERBERT H. HACKSTEDDE, OF CINCINNATI, OHIO, ASSIGNOR TO THE CENTURY MACHINE COMPANY, OF CINCINNATI, OHIO, A CORPORATION OF OHIO.

FLOUR STORING, ELEVATING, AND SIFTING APPARATUS.

1,320,684. Specification of Letters Patent. Patented Nov. 4, 1919.

Application filed August 23, 1917. Serial No. 187,762.

*To all whom it may concern:*

Be it known that I, HERBERT H. HACKSTEDDE, a citizen of the United States of America, and resident of Cincinnati, in the county of Hamilton and State of Ohio, have invented a new Improvement in Flour Storing, Elevating, and Sifting Apparatus, of which the following is a specification.

An object of my invention is to produce a flour storing, elevating and sifting apparatus, particularly for use with dough mixers, in which the amount of power required to operate the device is small and in which the elevated flour is prevented from falling to the bottom of the elevator shaft and accumulating therein to choke the apparatus.

A further object is to produce a flour storing, elevating and sifting device, which occupies a small amount of space and which may be utilized in any position required by the position occupied by the machine to receive the sifted flour.

These and other objects are attained in the flour storing, elevating and sifting apparatus described in the following specification and illustrated in the accompanying drawings, in which, Figure 1 is a side elevation of flour storing, elevating and sifting apparatus embodying my invention, certain portions being broken away for convenience of illustration.

Fig. 2 is a fragmental sectional elevation taken on the line 2—2 of Fig. 1.

Fig. 3 is a fragmental sectional elevation taken on the line 3—3 of Fig. 1.

Fig. 4 is a fragmental sectional elevation taken on the line 4—4 of Fig. 1.

My storing, elevating and sifting apparatus consists of a flour storage bin 5, an elevator 6 connected therewith at its bottom, and a sifting device 7 connected with the elevator at its top. The storage bin 5 consists of a receptacle 8 having at its bottom inclined sides adapted to direct the flour toward the center thereof and having a conveyer worm 9 located in the bottom and adapted to direct the flour from the receptacle 8 into the bottom of the casing 10 of the elevator 6, in which a bearing 11 is provided for journaling the shaft 12 which carries the worm 9. Upon shaft 12 a sprocket 13 is secured and passing over this sprocket is a conveyer chain 14, which at its upper end passes over a similar sprocket 15 operatively mounted in bearings 16 and 17 in the top of the elevator casing 10. Upon chain 14 a series of flour elevating buckets 18 are secured, these buckets consisting of sections of angle irons secured to the alternate links of the chain and having their flanges 19 extending inwardly. It is these flanges which form the shelves or containers upon which the flour is deposited for the purpose of elevating it to the top of the conveyer casing. By means of these elevating buckets or shelves the flour is dumped therefrom toward the center of the elevator casing as each shelf arrives at the top thereof, into trough 20, located centrally at the top of the casing for receiving the flour. This trough is located between the outwardly and downwardly moving sections of the chain and extends entirely across the casing. In the trough a conveyer worm 21 is rotatively mounted, one end of the shaft which carries the worm being located in a bearing 22 mounted in one wall of the casing and extending to the outside of the casing for the purpose of receiving the necessary driving mechanism. Conveyer worm 21 extends through the opposite side of the casing and is surrounded by a tube 23 through which the flour which is dumped into the trough 20 is fed. The opposite end of the tube 23 is connected with the sifting device 7, the shaft 24 which mounts worm 21, being located in a bearing 25 secured to the casing 26 of the flour sifter. That portion of shaft 24 which is located within casing 26, has secured thereto the flour agitating brushes 27, which pass over the sieve 28, which sift the flour and allow it to pass through the opening 29 formed in the sifter casing and into the machine 30, which is to receive the sifted flour. To the projecting end of shaft 24 is secured a sprocket 31 and a pinion 32. Pinion 32 meshes with gear 33 mounted upon shaft 34, to which sprocket 15 is secured. Passing over sprocket 31 upon shaft 24 is a chain 35, which at its lower end passes over a sprocket operatively connected with drive shaft 36 by means of any suitable clutch mechanism 37, which is operated in any suitable manner, such as by manually operated lever 38. Upon the opposite end of shaft 36 driving pulley 39 is secured.

In the operation of my storing, elevating and sifting apparatus, the flour contained in receptacle 8 is directed by the inclined sides of the bottom thereof toward worm 9. The operation of this worm causes the flour to be deposited at the bottom of chute casing 10 and into position to drop on to shelves 19 of the conveyer buckets 18. From this point the flour is elevated to the top of the casing and as the chain passes over sprocket 15, it is dumped from the shelves into the trough 20 where it is carried by worm 21 from the trough, through tube 23 and into sifter 7.

The operation of the mechanism which drives my apparatus, causes shaft 24, which carries worm 21, to be driven before any other portion of the apparatus is driven. Next the conveyer chain is actuated through gears 32 and 33. Then worm 9 receives the driving power. The advantage attained by such an arrangement of the driving mechanism of the apparatus, is that of danger of the flour becoming packed in any portion of the apparatus, is obviated. Should the sprocket 31 slip on shaft 24, the entire apparatus would stop and thereby prevent the delivery of any more flour to the conveyer worm and sifter, and thus avoid choking of the worm and sifter mechanism. Should pinion 32 become loosened and slip upon shaft 24, worm 21 would continue its operation and the remainder of the apparatus would stop. Thus such a construction would avoid choking of the apparatus at this point. Should gear 33 or sprocket 15 slip upon shaft 34, the same thing would occur. Loosening or slipping of sprocket 13 upon shaft 12 would result in stoppage of worm 9 and allow continued operation of elevator chain 14. Thus the accumulated flour in the bottom of chute casing 10 would be removed and further delivery of flour thereto would be prevented.

A further advantage of my improved construction is that the elevator 6 is located centrally of one end of the storage bin and the conveyer tube 23 and sifter 7 are also located centrally of elevator 6. Thus the apparatus may be used when the mixing or other machine designed to receive the sifted flour, is located in a corner or close to a wall, my apparatus being designed to have either side thereof located next to the wall and without requiring the repositioning of the mixing or other machine or without necessitating alterations being made in my storing, elevating and sifting apparatus. In other words the location of the various parts of my improved apparatus centrally of each other, so as to render the entire apparatus symmetrical, enables it to be faced in either direction according to the position occupied by the mixing machine in the room in which it is located.

A further advantage attained in my improved construction, is that by providing shelf-like elevating members and by locating them upon the inner side of the chain, I am enabled to incase these elements within a casing which is materially smaller than elevator casings heretofore designed for such a purpose.

Having thus described my invention, what I claim is:

In the device of the class described the combination of a sifter adapted to be located above a dough mixer, a vertical elevator casing adapted to be located at a side of the dough mixer, a trough connecting the sifter and the upper end of the elevator casing, a bin at the lower end of the elevator casing, and at the opposite side from the trough and feed shafts in the bin and the trough located in the same vertical plane and an elevating device in the casing and located centrally of the shafts, whereby the device is adapted to be located at either side of the dough mixer.

In testimony whereof, I have hereunto subscribed my name this 21st day of August, 1917.

HERBERT H. HACKSTEDDE.

Witnesses:
JOHN S. FITZPATRICK,
WALTER F. MURRAY.